United States Patent [19]
Jones et al.

[11] Patent Number: 5,729,767
[45] Date of Patent: Mar. 17, 1998

[54] SYSTEM AND METHOD FOR ACCESSING PERIPHERAL DEVICES ON A NON-FUNCTIONAL CONTROLLER

[75] Inventors: Craig S. Jones; Victor K. Pecone; Jay Lory, all of Austin, Tex.

[73] Assignee: Dell USA, L.P., Round Rock, Tex.

[21] Appl. No.: 319,689

[22] Filed: Oct. 7, 1994

[51] Int. Cl.$^6$ ................................................. G06F 13/00
[52] U.S. Cl. ............................................. 395/882; 395/280
[58] Field of Search .......................... 395/325, 275, 395/280, 882; 371/10, 22.3; 364/132

[56] References Cited

U.S. PATENT DOCUMENTS

| | | | |
|---|---|---|---|
| 4,484,263 | 11/1984 | Olson et al. | 395/275 |
| 4,736,373 | 4/1988 | Schmidt | 371/10 |
| 4,740,882 | 4/1988 | Miller | 364/132 |
| 5,019,799 | 5/1991 | Oshiage et al. | 340/438 |
| 5,047,921 | 9/1991 | Kinter et al. | 364/200 |
| 5,054,024 | 10/1991 | Whetsel | 371/22.3 |
| 5,056,093 | 10/1991 | Whetsel | 371/22.3 |
| 5,197,034 | 3/1993 | Fandrich et al. | 365/227 |
| 5,361,343 | 11/1994 | Kosonocky et al. | 395/425 |
| 5,396,602 | 3/1995 | Amini et al. | 395/325 |

*Primary Examiner*—Jack B. Harvey
*Assistant Examiner*—David A. Wiley
*Attorney, Agent, or Firm*—Skjerven, Morrill, MacPherson, Franklin & Friel, L.L.P.; Stephen A. Terrile

[57] ABSTRACT

A computer system including a host CPU, a primary PCI bus coupled to the CPU, and a bus adapter coupled to the primary PCI bus, wherein the host CPU can access peripherals comprised in the bus adapter even when the bus adapter is inoperable. The bus adapter includes a PCI to PCI interface controller which includes a primary PCI interface for coupling to the primary PCI bus and a secondary PCI interface bridge for coupling to a secondary PCI bus. Peripheral bus interface logic is coupled between the primary PCI interface and the secondary PCI interface, and this interface logic couples to various peripheral devices, including ROM/Flash memory and non-volatile static random access memory (NVSRAM). According to the present invention, a host utility executing on the CPU can access the peripheral devices without having to access the secondary PCI bus. Thus, if the secondary PCI bus becomes inoperable or the local processor is unable to boot, the host can still access the memory in the peripheral devices because the peripheral interface is effectively decoupled from the secondary PCI bus and the local processor. The present invention includes a host utility which can update the Flash memory, thereby providing a cost-effective and efficient mechanism for restoring code in a corrupted Flash device on a failed board. This also enables the Flash memory to be programmed for the first time during manufacturing. The system and method of the present invention allows the host CPU to access the NVRAM to obtain event failure information even if the secondary PCI bus has failed.

16 Claims, 7 Drawing Sheets

SYSTEM AND METHOD FOR ACCESSING PERIPHERAL DEVICES ON A NON-FUNCTIONAL CONTROLLER

FIELD OF THE INVENTION

The present invention relates to a PCI bus interface controller, and more particularly to a PCI to PCI bus interface controller which includes a peripheral slave bus extension that can be accessed even if the bus interface controller is non-functional.

DESCRIPTION OF THE RELATED ART

Modern computer systems are moving toward system architectures which include a local bus that is coupled directly to the CPU's local bus through local bus bridge logic. Two different local bus standards currently exist, these being the VESA (Video Electronics Standards Association) VL bus standard and the peripheral component interconnect (PCI) bus standard from Intel Corporation. The new local bus standards such as the VL bus and the PCI bus are not constrained by the requirement to be backwards compatible with prior expansion bus adapters and thus provide much higher throughput than prior expansion buses. Examples of devices which can be coupled to local expansion buses include SCSI adapters, network interface cards, video adapters, etc.

In some instances, it is desirable to couple an adapter card to a local bus, such as the PCI bus, wherein the adapter includes a secondary PCI local bus for added expansion capabilities. In an embedded PCI adapter design which includes a secondary PCI local bus, there is a need for a local non-PCI standard interface, such as an ISA bus or X-bus, for peripheral devices. The types of peripheral devices typically required in a bus adapter include direct memory access (DMA) logic, ROM/Flash memory, non-volatile static random access memory (NVSRAM), communications ports, diagnostics ports, timers, interrupt control logic, command/status registers, a real time clock, etc. The Flash memory is typically used to store the firmware for the embedded controller's local processor. Using Flash memory to store the processor's firmware allows convenient and cost effective firmware upgrades. The NVRAM typically stores dynamic event and failure logs for the embedded controller subsystem. If the bus adapter should fail, the dynamic event and failure log information is used to ascertain the cause of the failure. Virtually all embedded PCI adapter cards require some combination of the above peripheral devices for a complete functional architecture.

The local processor in the PCI controller is required to fetch instructions from the Flash device to successfully boot and initialize. In order for the local processor to successfully boot, the Flash memory is required to have valid code. However, there are circumstances where the code in the Flash memory may become corrupted or invalid. Examples include initial blank part installation in manufacturing, power failure during a Flash update, and an erratic bus failure which inadvertently causes the Flash device to be erased. When the Flash code becomes corrupted or invalid, this condition prevents the local processor from booting and thus typically renders the local or secondary bus inaccessible by the host.

In a PCI-PCI interface controller where the PCI to peripheral interface is on the secondary bus side to couple the peripheral devices, if the secondary bus becomes inaccessible and/or the bus adapter fails, then it is impossible to access the Flash memory. Therefore, currently the Flash device must be socketed to the board in the event it must be removed because it has become corrupted and/or invalid. This is an impractical implementation for non-PLCC (plastic leaded chip carrier) surface mount packages such as TSOP (thin small outlined package), and also adds to system cost. Therefore, an improved system and method is desired which allows host or local processor access to a Flash device in a PCI-PCI interface controller even when the secondary local bus is inaccessible or the bus adapter has failed. This would obviate the necessity of having to socket the Flash device to the board in the case of Flash failures.

It would also be highly desirable to enable host access to a Flash device when the local processor is inoperable to allow the Flash device to be installed blank and then programmed by a host utility during the manufacturing process. This would eliminate the cost of pre-programming the device prior to board installation.

As mentioned above, the non-volatile RAM in an adapter board stores dynamic event and failure logs for the embedded controller subsystem. Thus the NVRAM provides a powerful debugging and service/support resource for evaluation of a failed board. However, if the NVRAM is positioned on the secondary PCI bus and the local processor and/or secondary bus is inoperable in the failed adapter, then the event logs in the NVRAM are inaccessible. Thus many failed adapters that are returned by customers to system vendors include little or no accessible data describing their condition prior to failure. Therefore, a system and method is desired which allows access to the NVRAM in a failed adapter even when the secondary PCI bus is inaccessible.

SUMMARY OF THE INVENTION

The present invention comprises a computer system including a host CPU, a primary PCI bus coupled to the CPU, and a bus adapter coupled to the primary PCI bus, wherein the host CPU can access peripherals comprised in the bus adapter even when the bus adapter is inoperable. The bus adapter includes a PCI to PCI interface controller which includes a primary PCI interface for coupling to the primary PCI bus and a secondary PCI interface bridge for coupling to a secondary PCI bus. Various logic may be coupled to the secondary PCI bus which implements a desired function, such as SCSI controllers, network interface logic, etc. A local processor is also coupled to the secondary PCI bus. Peripheral bus interface logic is coupled between the primary PCI interface and the secondary PCI interface, and this interface logic couples to various peripheral devices, including a direct memory access (DMA) system, interrupt system, ROM/Flash memory, non-volatile static random access memory (NVSRAM), timers, registers, etc. The Flash memory preferably stores boot and initialization code firmware for the adapter's local processor. The NVRAM stores dynamic event and failure logs for the adapter.

According to the present invention, a host utility executing on the host CPU can access the peripheral devices without requiring the bus adapter be operational and without having to access the secondary PCI bus. Thus, if the secondary PCI bus becomes inoperable and/or the local processor is unable to boot, the host can still access the controller's peripheral interface because the peripheral interface is effectively decoupled from the secondary PCI bus and the local processor.

The present invention includes a host utility which can update the Flash memory independently of the secondary bus and/or local processor. This provides a cost-effective and efficient mechanism for restoring code in a corrupted Flash device on a failed board. This also enables the Flash memory to be programmed for the first time during manufacturing. In other words, the Flash memory device can be installed blank and then later programmed by a host utility in the manufacturing process. This eliminates the cost of preprogramming the device prior to board installation. The present invention also includes a utility that allows the host CPU to access the NVRAM to obtain event failure information even if the local processor is unable to boot or the secondary PCI bus has failed. As discussed in the background section, many failed controllers that are returned include little or no data describing the conditions prior to failure because the event logs are typically inaccessible. The present invention allows much greater access to these event logs in many diverse types of bus adapter failures.

The method of the present invention for enabling host access to peripheral devices in the bus adapter when the local processor is unable to boot or the secondary bus is inaccessible is as follows. First, a jumper is set to direct the primary PCI interface to configure itself as a memory device and to map the memory of the peripheral devices into the primary PCI interface. This jumper also serves to maintain a reset signal asserted to the local processor to prevent the local processor from booting. The CPU then begins its POST procedure. During POST, the host CPU views the memory in the primary PCI interface and maps this memory into its local memory. The CPU preferably maps a 16 Kbyte memory block into its local memory so that future utilities can access memory in the peripheral devices. A desired application is then run on the host CPU which accesses memory in one or more of the peripheral devices. For example, the application can program the Flash memory if the Flash memory has become corrupted or was installed blank. The application program may also read event and failure log information from the NVRAM if the adapter has failed. Since the peripheral devices do not reside on the secondary PCI bus, these accesses can occur even if the secondary PCI bus is inaccessible and/or the local processor is inoperable. After the application has completed, the jumper is removed, which restores the memory mapping to memory in the primary PCI interface and enables the local processor to boot. The computer system is then rebooted, and the host CPU again begins its POST procedure. During this POST the CPU sees the primary PCI interface as the respective bus adapter device, such as a disk controller or network interface card. Thus, the method of the present invention allows the host CPU to access peripheral device memory on a bus adapter even when the bus adapter is inoperable.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
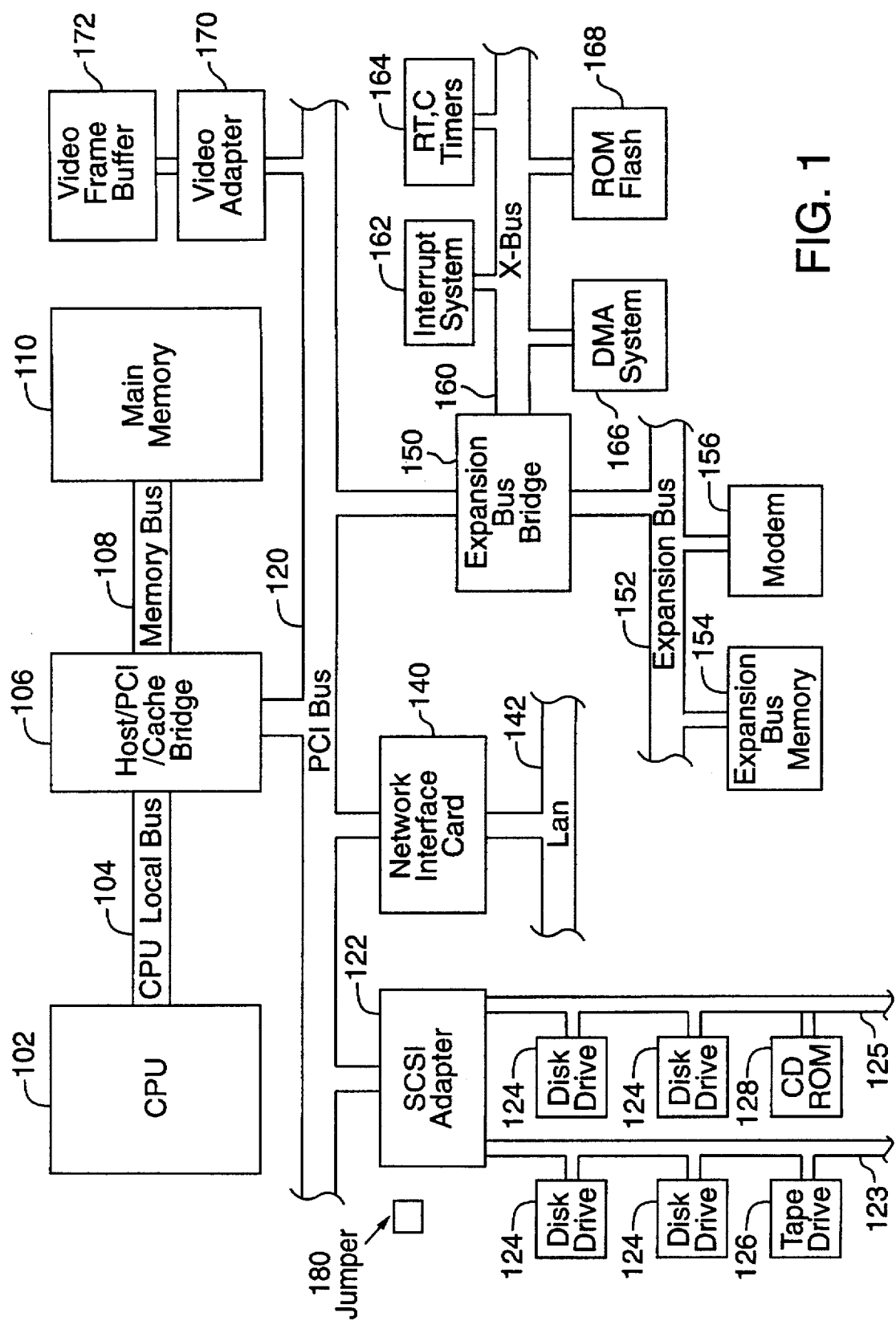
FIG. 1 illustrates a computer system incorporating a SCSI adapter which includes PCI-PCI interface logic according to the present invention.

Referring now to FIG. 1, a block diagram of a computer system incorporating the preferred embodiment of the present invention is shown. It is noted that the present invention may be incorporated into any of various types of computer systems. As shown, the computer system includes a central processing unit (CPU) 102 which is coupled through a CPU local bus 104 to a host/PCI/cache bridge 106. The bridge 106 couples through a memory bus 108 to main memory 110. The host/PCI/cache bridge 106 also interfaces to a peripheral component interconnect (PCI) bus 120. In the preferred embodiment, a PCI local bus is used. However, it is noted that other local buses may be used, such as the VESA (Video Electronics Standards Association) VL bus.

Various types of devices may be connected to the PCI bus 120. In the embodiment shown in FIG. 1, a video adapter 170 and video frame buffer 172 are coupled to the PCI bus 120 for controlling video functions. A SCSI (small computer systems interface) controller or SCSI adapter 122 is coupled to the PCI bus 120. The SCSI adapter 122 includes PCI to PCI interface logic according to the present invention. The SCSI adapter 122 also includes peripheral devices which can be accessed by utilities executing on the host CPU 102 even when the adapter 122 is inoperable. A jumper 180 is coupled to the SCSI adapter 122. The jumper 180 is set to allow host utilities to access peripheral device memory according to the present invention, as discussed further below. The SCSI controller or adapter 122 may be integrated into the motherboard of the computer system or may be a separate adapter card insertable into the PCI bus 120. In the present disclosure, the terms adapter and controller are intended to refer to either an embedded controller on the motherboard of the computer system or a controller on a removable adapter card.

In the preferred embodiment, the SCSI adapter 122 includes two SCSI channels 123 and 125. Each of these SCSI channels 123 and 125 may have various devices connected to them. In the embodiment shown in FIG. 1, the SCSI channel 123 includes two disk drive units 124 and a tape drive 126. The SCSI channel 125 includes two disk drive units 124 and a CD-ROM 128. It is noted that other devices may be connected to the SCSI channels 123 and 125, as desired. Various other devices may be connected to the PCI bus 120, such as a network interface card 140. As shown, the network interface card 140 interfaces to a local area network (LAN) 142.

Expansion bus bridge logic 150 is also preferably coupled to the PCI bus 120. The expansion bus bridge logic 150 interfaces to an expansion bus 152. The expansion bus may be any of varying types, including the industry standard architecture (ISA) bus, also referred to as the AT bus, the extended industry standard architecture (EISA) bus, or the microchannel architecture (MCA) bus. Various devices may be coupled to the expansion bus 152, including expansion bus memory 154 and a modem 156. The expansion bus bridge logic 150 also couples to a peripheral expansion bus referred to as the X-bus 160. The X-bus 160 is used for connecting various peripherals to the computer system. As shown, an interrupt system 162, a real time clock (RTC) and timers 164, a direct memory access (DMA) system 166, and ROM/Flash memory 168 are coupled to the X-bus 160. Other peripherals (not shown) are preferably connected to the X-bus 160, including communications ports, diagnostics ports, command/status registers, non-volatile static random access memory (NVSRAM), etc.

Figure 2:
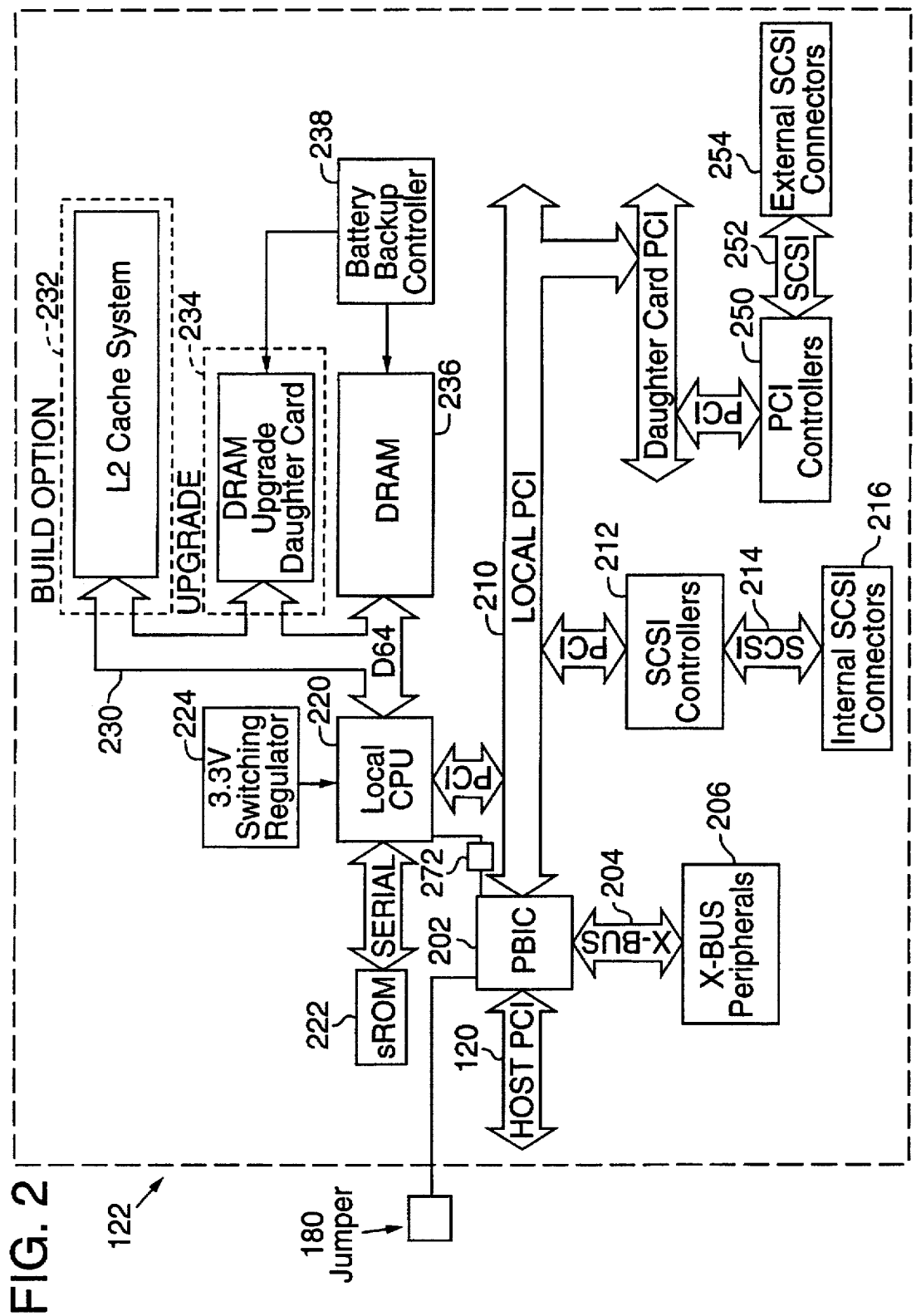
FIG. 2 is a more detailed block diagram of the SCSI adapter of FIG. 1, including a PCI bus interface controller according to the preferred embodiment of the present invention.

Referring now to FIG. 2, a block diagram illustrating the SCSI adapter 122 in FIG. 1 is shown. In the preferred embodiment of the invention, PCI to PCI interface bridge logic according to the present invention is comprised within SCSI adapter 122. However, it is noted that the PCI to PCI bridge logic of the present invention may be incorporated into various types of devices, including the network interface card 140, video adapter 170, and other types of devices. As shown in FIG. 2, the SCSI adapter 122 includes a PCI bus interface chip (interface chip) 202, which couples to the host or primary PCI bus 120. The interface chip 202 includes the PCI to PCI interface logic of the present invention, which is discussed further below. The interface chip 202 interfaces through a second X-bus 204 to various X-bus peripherals 206 as shown. It is noted that the X-bus 204 in the SCSI adapter 122 is different from the X-bus 160 in FIG. 1. The various X-bus peripherals 206 preferably include a DMA system, interrupt system, timers, a real time clock (RTC), configuration ports, diagnostic ports, command/status registers, ROM/Flash memory, and non-volatile SRAM (NVSRAM) (all not shown).

The interface chip 202 also couples to a secondary PCI bus 210. As shown, the secondary PCI bus 210 is different than the primary PCI bus 120. The secondary PCI bus 210 is referred to as either the secondary PCI bus or the local PCI bus, and the primary PCI bus 210 is referred to as either the primary PCI bus or the host PCI bus. It is noted that the term "local PCI bus" used to describe the bus 210 should not be confused with the fact that the PCI bus itself can be classified as a local bus.

SCSI controllers 212 are coupled to the secondary PCI bus 210. The SCSI controllers 212 in turn couple through a SCSI bus 214 to internal SCSI connectors 216. In the preferred embodiment, two SCSI controllers are incorporated into block 212, and the SCSI bus 214 comprises the two SCSI channels 123 and 125. The internal SCSI connectors 216 are for attaching the various devices, such as the disk drives 124, tape drive 126, and CD ROM 128, as shown in FIG. 1.

A local CPU 220 is coupled to the secondary PCI bus 210. The local CPU 220 may be any of various types. In the preferred embodiment, the local CPU 220 is the PowerPC microprocessor produced by Motorola, IBM and Apple. In an alternate embodiment, the local CPU 220 is the Alpha chip from Digital Equipment Corporation (DEC). The local CPU 220 couples through a serial bus to an SROM 222. The local CPU 220 receives power from a 3.3 V switching regulator 224, as shown. The local CPU 220 includes a 64 bit data path which couples through a 64-bit data bus 230. Dynamic random access memory (DRAM) 236 is coupled to the 64-bit data bus 230. The 64-bit data bus 230 also includes a connection for coupling to an optional dynamic random access memory (DRAM) upgrade daughter card 234. An optional second level or L2 cache system 232 may also be coupled to the 64-bit data bus 230. The DRAM upgrade daughter card 234 and the L2 cache system 232 are shown in dotted lines and are options that are included in the preferred embodiment, but may be left out as desired. A battery backup controller 238 is coupled to each of the DRAM 236 and the DRAM upgrade daughter card 234. The local PCI bus 210 also includes a daughter card option for additional SCSI connections. As shown, additional PCI controllers 250 may be coupled to the local PCI bus 210 through a daughter card PCI bus as shown. The PCI controllers 250 couple through additional SCSI channels 252 to respective external SCSI connectors 254, as shown.

Jumper 180 connects to the interface chip 202 in the SCSI adapter 122. When the jumper 180 is set, the interface chip 202 configures itself as a memory device and maps in the memory of the peripheral devices. The jumper 180 also causes the interface chip 202 to generate a signal to reset logic 272 which provides a reset signal to the reset input of the local CPU 220. This prevents the local CPU 220 from booting. Thus, when the jumper 180 is set, a host utility executing on the host CPU 102 can access memory in the peripheral devices.

Figure 3:
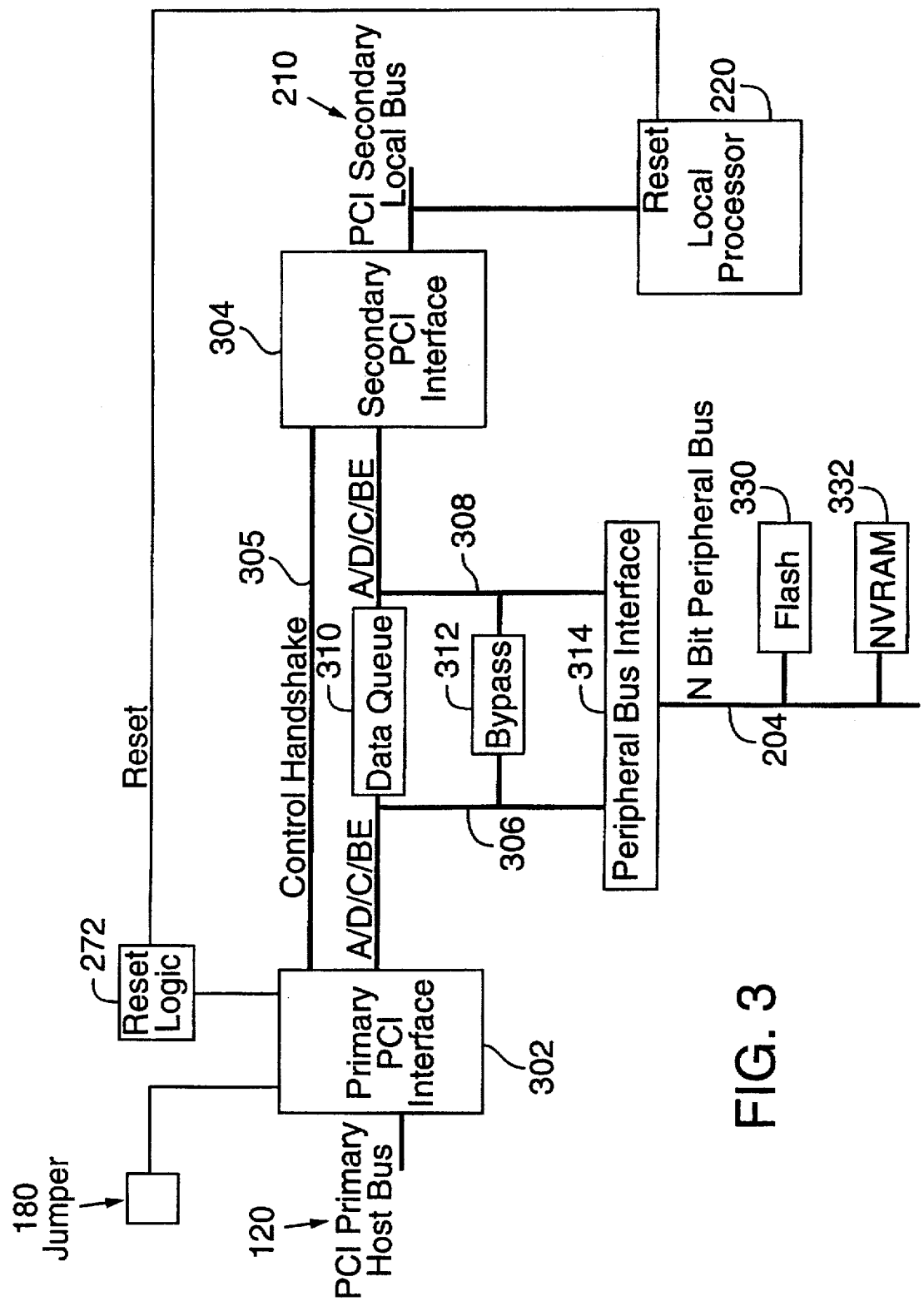
FIG. 3 illustrates the PCI to PCI interface system architecture of the present invention.

Referring now to FIG. 3, a block diagram illustrating the design of the PCI bus interface controller (interface chip) 202 according to the present invention is shown. The interface chip 202 includes a primary PCI interface 302 and a secondary PCI interface 304. As shown, the primary PCI interface 302 interfaces to the host or primary PCI bus 120. The secondary PCI interface 304 interfaces to the secondary or local PCI bus 210. The primary PCI interface 302 and secondary PCI interface 304 interface to each other via a control handshake signal 305 as shown. The primary PCI interface 302 also provides various bus signals over bus 306, including address, data, control and byte enable signals, referred to as A/D/C/BE. Likewise, the secondary PCI interface 304 provides bus signals, including address, data, control and byte enable signals, over bus 308. Data Queue 310 is coupled between bus 306 and bus 308 to allow data communication between primary PCI interface 302 and secondary PCI interface 304. A bypass 312 is coupled between each of the buses 306 and 308, and the primary PCI interface 302 and secondary PCI interface 304 provide their respective bus signals to each other through the bypass 312 as shown. The primary PCI interface 302 and secondary PCI interface 304 also each provide their respective bus signals over buses 306 and 308 to a peripheral bus interface 314. The peripheral bus interface 314 interfaces to an N bit peripheral bus, which is the X-bus 204. As mentioned above, various peripheral devices are connected to the N bit peripheral bus 204, including ROM/Flash memory 330 and non-volatile RAM 332 as shown, as well as direct memory access (DMA), controller logic, an interrupt subsystem, a real time clock, various timers, communication ports, diagnostic ports, command/status registers, etc. Jumper 180 connects to the primary PCI interface 302, and the primary PCI interface 302 provides a signal to Reset logic 272. The Reset Logic 272 provides a Reset signal to the local processor 220 as shown.

The interface chip 202 comprises a high performance host PCI to local PCI bus controller interface. The interface chip architecture of the present invention includes a symmetrical design for sharing DMA controller and peripheral extension bus (X-bus) resources between each PCI side. The primary PCI interface 302 and secondary PCI interface 304 provide master/slave interfaces between each PCI side. The PCI interfaces 302 and 304 symmetrically interface to the data queue 310 for DMA and/or burst cycles and symmetrically interface to the queue bypass buffer 312, which allows the PCI interfaces 302 and 304 to bridge directly. The PCI interfaces 302 and 304 target the peripheral bus 204 based on address and configuration mapping, and the interfaces 302 and 304 arbitrate between each other for access to the peripheral bus 204.

The symmetrical interface chip architecture of the present invention provides numerous advantages over those found in the prior art. For more information on some of these advantages, please see related co-pending application, Ser. No. 08/319,207 titled "PCI/PCI Bus Interface Controller with Non-coupled Peripheral Slave Bus Extension", and filed Oct. 6, 1994, which is hereby incorporated by reference.

The inclusion of primary and secondary PCI interfaces 302 and 304 allows peripheral I/O devices to be accessed without having to cross PCI sides. Thus, host devices on the primary PCI interface 302 can access devices on the peripheral X-bus 204 without having to arbitrate and gain access to the secondary PCI bus 210. Arbitration to gain access to the secondary PCI bus 210 would be required in a PCI-PCI interface control system where the peripheral X-bus interface resided as unique target device on the secondary PCI bus 210. Since host devices do not have to gain access to the secondary PCI bus 210 to access peripheral devices, the peripheral devices can be accessed when the local processor 220 is unable to boot and/or the secondary bus 210 is inoperable.

Therefore, the system of the present invention allows a host device to access Flash memory 330 or NVRAM 332 on the X-bus 204 when the local processor 220 is unable to boot and/or the secondary bus 210 is inoperable. Since the Flash memory 330 is accessible by the host, the Flash memory 330 can be reprogrammed by the host if it has become invalid or corrupted. This removes the need for the Flash device 330 to be socketed for removal in case it becomes corrupted or invalid and, as a result, the local processor 220 is unable to boot. Also, the system architecture of the present invention allows the Flash memory device 330 to be installed blank and then programmed by a host utility in the manufacturing process. This eliminates the cost of pre-programming the device prior to board installation. Further, the NVRAM 332 can be accessed for event log and failure information even if the SCSI adapter 122 is inoperable and the local processor 220 is unable to boot. This provides valuable failure information that many times is otherwise inaccessible.

Figure 4:
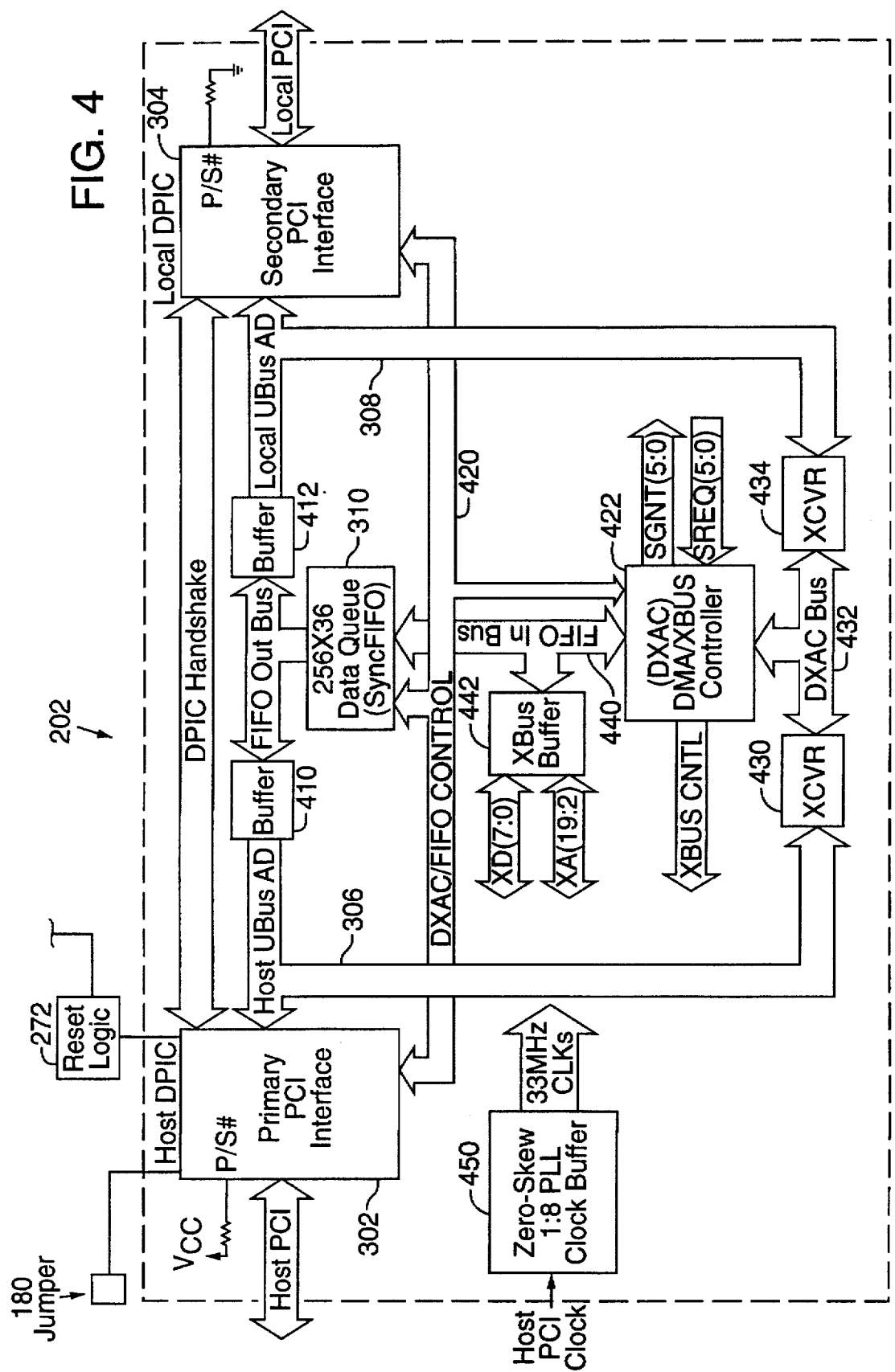
FIG. 4 is a block diagram illustrating the PCI bus interface controller of FIG. 2.

Referring now to FIG. 4, a more detailed block diagram of the interface chip 202 is shown. FIG. 4 illustrates a presently preferred embodiment of the interface chip 202 of FIG. 2. Elements described in FIG. 4 which are similar to those in FIG. 3 include the same reference numerals for convenience. As shown, the interface chip 202 includes primary PCI interface 302 and secondary PCI interface 304. In the preferred embodiment, the primary PCI interface 302 and the secondary PCI interface 304 are comprised of the same logic chip, referred to as the Dual PCI Interface Controller (DPIC). The DPIC chip includes a primary/secondary strappable pin which allows the chip to be used as separate host and local PCI interfaces in the interface chip 202, depending on the state of the pin. The DPIC configured as the primary PCI interface 302 is referred to as the Host DPIC, and the DPIC configured as the secondary PCI interface 304 is referred to as the Local DPIC, as shown. The use of a single logic chip as the primary and secondary PCI interfaces 302 and 304 reduces system costs.

The primary PCI interface 302 and the secondary PCI interface 304 communicate with each other via DPIC control handshake 305. Primary PCI interface 302 couples to host UBUS 306 which includes address and data portions as well as control and byte enable portions. Likewise, secondary PCI interface 304 couples to local UBUS 308 as shown. The host UBUS 306 connects to buffer 410 and likewise local UBUS 308 connects to buffer 412. The buffers 410 and 412 are connected via a FIFO out bus 414. The FIFO out bus 414 connects to data queue 310. The data queue 310 is preferably a synchronous 256×36 bit single channel FIFO data queue. However, it is noted that other data queues may be used as desired. The primary PCI interface 302 and secondary interface 304 also are coupled through a control bus referred to as the DXAC/FIFO control bus 420. The DXAC/FIFO control bus 420 couples to the data queue 310 and also connects to DMA/XBUS controller logic 422, also referred to as the DXAC. As shown, the DMA/XBUS controller logic 422 generates X-bus control signals, X-bus request signals referred to as SREQ[5:0], and grant signals referred to as SGNT[5:0]. The host UBUS 306 connects to a transceiver 430 which connects to a DXAC bus 432. Likewise, the local UBUS 308 connects to transceiver 434, which couples to the DXAC bus 432. The DXAC bus 432 couples to the DMA/XBUS controller logic 422. The data queue 310 is coupled to the DMA/XBUS controller 422 via a FIFO In bus 440. The FIFO In bus 440 couples to an X-bus buffer 442 which in turn provides X-bus addressing signals XA[19:2] and X-bus data signals XD[7:0]. The various logic comprised in the interface chip 202 preferably receives a 33 MHz CLK signal from the host PCI bus through CLK buffer 450.

The Host and Local DPIC 302 and 304 are each responsible for PCI bus mastering and bus target slave control on the respective host and Local PCI sides of the SCSI controller 122. In the preferred embodiment, all PCI data and address transactions are completed through the DPIC. The primary (host) and secondary (local) DPICs 302 and 304 arbitrate between each other for the respective interface chip UBUS 306 and 308 and X-bus 204. These interfaces are preferably slaves to the DMA/XBUS (DXAC) controller 422. The DPICs are PCI masters for all DMA transactions.

Jumper 180 connects to the primary PCI interface 302, and the primary PCI interface 302 provides a signal to Reset logic 272. The Reset Logic 272 provides a Reset signal to the local processor 220 (not shown).

Figure 5:
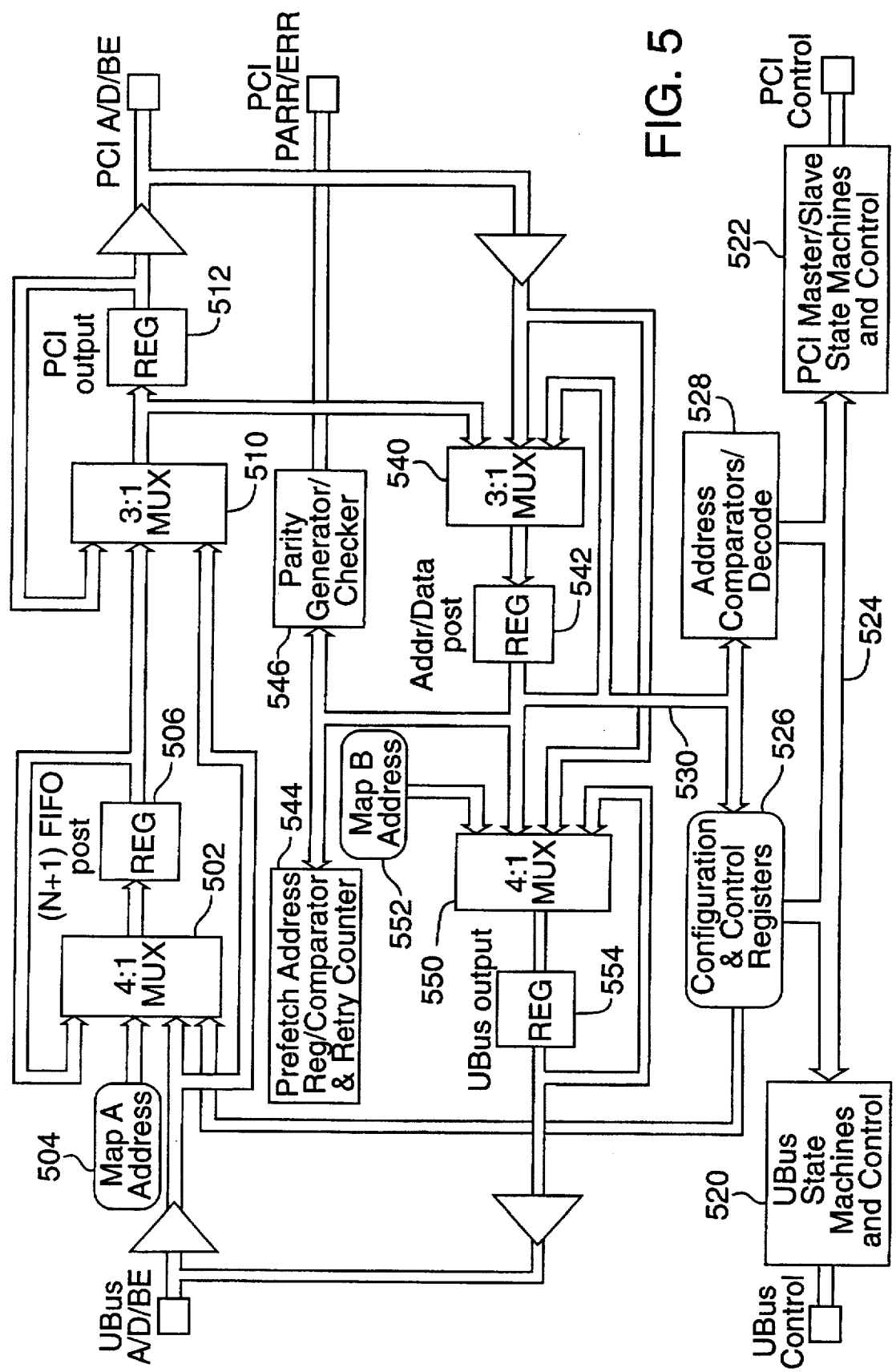
FIG. 5 illustrates the data/address path of each respective dedicated PCI interface controller of FIG. 4.

Referring now to FIG. 5, a diagram illustrating the data/address path of each respective DPIC 302 and 304 is shown. As shown in FIG. 4, each DPIC 302 and 304 connects on one side to a PCI bus and on another side to a UBUS. As shown in FIG. 5, the address, data and byte enable signals of the UBUS are connected to a 4:1 multiplexer 502. A memory map block referred to as Map A Address 504 also provides input to the multiplexer 502. The Map A Address block 504 provides addressing to a 256 Kbyte region accessible on the host side, and this region is the primary memory region used by host drivers to access the SCSI controller 122. The multiplexer 502 provides output to an N+1 FIFO posting register 506. The register 506 in turn provides output back to an input of the multiplexer 502 as shown. The register 506 also provides output to a 3:1 multiplexer 510. The UBUS also provides signals that are connected to an input of the multiplexer 510. The multiplexer 510 provides output to a PCI output register 512 which in turn provides output back to the multiplexer 510. The register 512 also provides output to the PCI bus, as shown.

The PCI bus is coupled to a second 3:1 multiplexer 540. The output of the multiplexer 510 also provides input to the multiplexer 540. Multiplexer 540 provides an output to an address/data posting register 542, which is coupled to a bus 530. The bus 530 provides input to the multiplexer 540. The bus 530 couples to prefix address register/comparator and retry counter 544 and parity generator checking logic 546, as shown. The parity generator/checking logic 546 provides a parity error signal on the PCI bus as shown. The register 542 provides an output over bus 530 to a second 4:1 multiplexer 550. The multiplexer 550 also receives input from the PCI bus and from a Map B address block 552. The Map B address block 552 provides addressing for a 256 Kbyte region accessible on the SCSI controller local side which is used by the SCSI controller 122 to maintain full PCI address compatibility. The multiplexer 550 provides output to a UBUS output register 554, which in turn provides output back into the multiplexer 550. The UBUS output register 554 also couples to the UBUS.

UBUS control signals are coupled to UBUS state machine and control logic 520, and PCI control signals are provided to PCI master/slave state machine and control logic 522. The UBUS state machine and control logic 520 is coupled to the PCI master/slave state machine and control logic 522 via a bus 524. The bus 524 couples to configuration and control registers 526 and address comparator/decode logic 528. The configuration and control registers 526 provide output to the multiplexer 502. The configuration and control registers 526 couple to the address comparator/decode logic 528 via bus 530.

Figure 6:
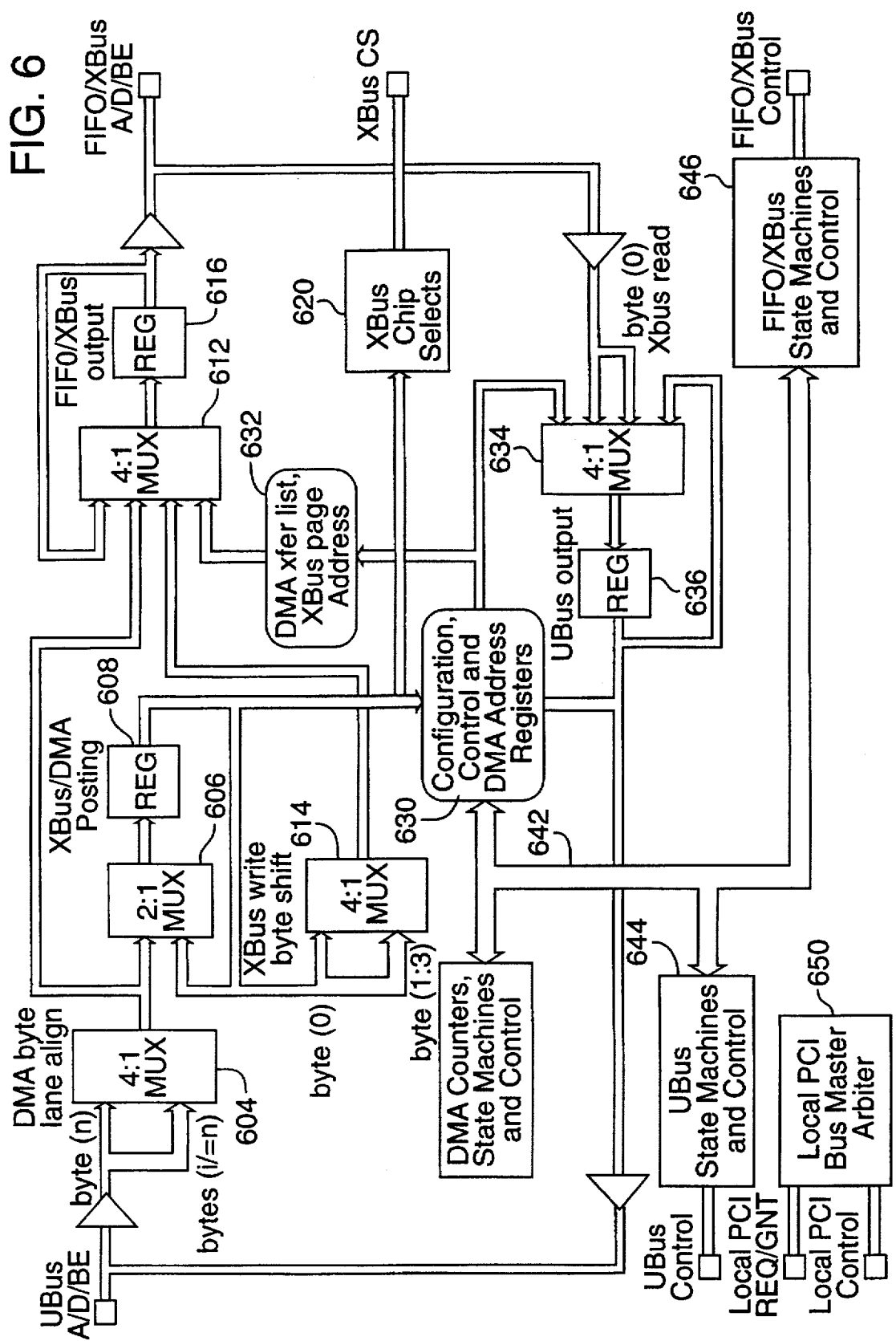
FIG. 6 illustrates the data/address path of the DMA/XBUS data controller and local arbiter of FIG. 4.

Referring now to FIG. 6, a block diagram illustrating the address path of the DMA/XBUS controller (DXAC) 422 is shown. As shown, the UBUS is connected to a DMA byte lane alignment multiplexer 604. The multiplexer 604 provides output to a 2:1 multiplexer 606 and also provides output to a second 4:1 multiplexer 612. The multiplexer 606 provides output to an X-bus/DMA posting register 608. The register 608 provides output to the multiplexer 606 and to an X-bus write byte shift 4:1 multiplexer 614. The multiplexer 614 provides an output to the multiplexer 612. The multiplexer 612 provides an output to a FIFO/X-bus output register 616, which in turn provides an output back to the multiplexer 612. The register 616 also provides output to the FIFO bus 440 and correspondingly to the X-bus 204.

The register 608 further provides output to X-bus chip select logic 620 which provides a chip select signal out onto the X-bus. The register 608 also provides an output to configuration control and DMA address registers 630. The registers 630 provide output to a 4:1 multiplexer 634. The FIFO/X-bus provides two inputs to the multiplexer 634. The multiplexer provides an output to a UBUS output register 636 which provides an output back to an input of the multiplexer 634. The register 636 also provides an output to the register block 630. The UBUS output register 636 also couples to the UBUS as shown. The configuration control and DMA address registers 630 are coupled to DMA counter state machine and control logic 640 via a bus 642. The bus 642 also couples to UBUS state machine and control logic 644, which couples to the control portion of the UBUS. The bus 642 also couples to FIFO/X-bus state machine and control logic 646 which couples to the control portion of the FIFO/X-bus 440. Local PCI bus master arbiter logic 650 is coupled to the control portion of the local PCI bus and the request/GNT portion of the local PCI bus.

Figure 7:
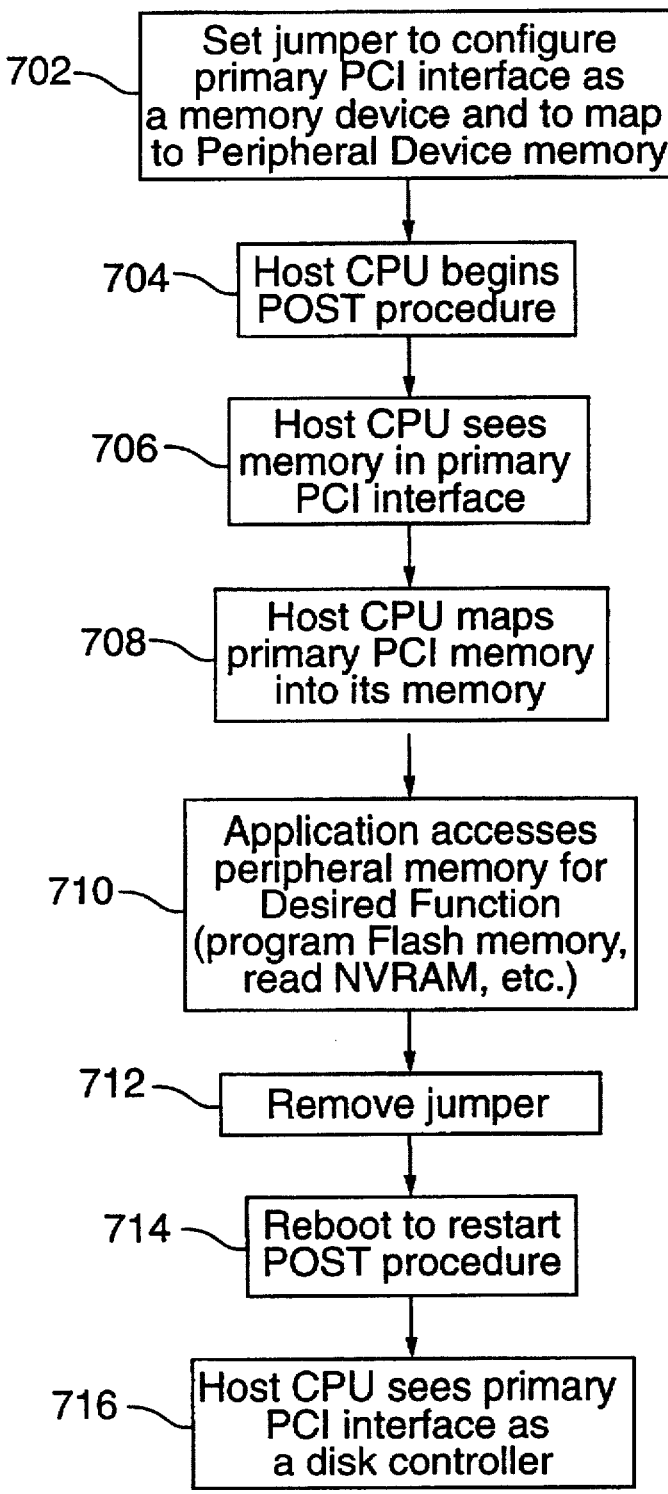
FIG. 7 is a flowchart diagram illustrating operation of a method for accessing peripheral memory in an embedded controller during powerup of the computer system.

Referring now to FIG. 7, a flowchart diagram illustrating operation of a method for enabling the host CPU 102 to access peripheral devices in the bus adapter 122 even when the local processor 220 is unable to boot and/or the secondary bus is inaccessible is shown. The method of the present invention updates the Flash memory 330 independently of the secondary local bus 210 and/or local processor 220. This provides a cost-effective and efficient mechanism for restoring code in the Flash device 330 if the Flash device 330 has become corrupted and as a result, the local processor 220 is unable to boot. This also enables the Flash memory 330 to be programmed for the first time during manufacturing. In other words, the Flash memory device 330 can be installed blank and then later programmed by a host utility in the manufacturing process. This eliminates the cost of preprogramming the device prior to board installation. The present invention also allows the host CPU 102 to access the NVRAM 332 to obtain event failure information even if the local processor 220 is unable to boot and/or the secondary PCI bus 210 has failed. As discussed in the background section, many failed controllers that are returned include little or no data describing the conditions prior to failure because the event logs are typically inaccessible. The present invention allows much greater access to these event logs in many diverse types of bus adapter failures.

Referring again to FIG. 7, in step 702 jumper 180 is set to direct the primary PCI interface to configure itself as a memory device and to map the memory of the peripheral devices into the primary PCI interface 302. Thus, subsequent CPU reads or writes to the primary PCI interface 302 while the jumper 180 is set actually access memory in selected peripheral devices such as Flash memory 330 or NVRAM 332, depending on the host utility. The result of setting the jumper 180 is to make the Flash device 330, NVRAM 332 and the memory of other peripheral devices accessible by the host CPU 102. The jumper 180 provides both memory and I/O mapping in systems which support both memory and I/O mapping, such as systems using Intel CPUs. In other systems which include only memory mapping, such as RISC systems or Apple systems, the jumper only provides a memory map to the peripheral devices.

In step 704 the CPU begins its POST (power on self test) procedure. During the POST procedure in step 706 the host views the memory in the primary PCI interface 302 and in step 708 the host CPU 102 maps this memory into its local memory. The CPU 102 preferably maps a 16 Kbyte memory block window into its local memory so that future host utilities can access memory in the peripheral devices. Since the host CPU 102 only maps a 16 Kbyte window corresponding to the memory of the peripheral devices into its local memory, the host CPU 102 only "sees" a 16 Kbyte window of the actual peripheral device memory. The DXAC chip 422 includes a register referred to as the X-bus Paging Register that is used to adjust this 16 Kbyte window to access the memory of different peripheral devices or to access different portions of the memory of a peripheral device. For example, the Flash device 330 is actually 512 Kbytes, and thus the CPU 102 is required to do 32 16 Kbyte writes to reprogram the Flash memory.

In step 710 a desired application executes on the host CPU 102 which accesses the desired peripheral in the SCSI adapter 122. In the preferred embodiment, the CPU 102 accesses, i.e., reads or writes, memory in the primary PCI interface 302, and the primary PCI interface 302 in turn accesses the desired peripheral device. In the case of a write, the primary PCI interface 302 receives the write data in a posting register and transfers the write data to the desired peripheral. In the case of a read, the primary PCI interface 302 receives the read request and the addresses corresponding to the desired data, obtains the requested data from the respective peripheral device, and provides the requested data to the CPU 102. Since the host CPU 102 only sees a 16 Kbyte window of memory, numerous CPU reads or writes may be required to accomplish the desired access. The interface chip 202 uses the X-bus paging register discussed above to increment through 16 Kbyte windows of data to perform the transfer.

Various types of applications can execute in step 710 to access desired peripheral devices. In the preferred embodiment, one application programs the Flash memory 330. This is preferably for cases where Flash memory 330 was installed blank and needs to be programmed or has become corrupted and/or contains invalid code. As discussed above, in prior art systems when the Flash memory is blank or becomes corrupted, the local processor is unable to boot, rendering the bus adapter inoperable and thus the Flash memory inaccessible. In the present invention, the Flash memory 330 is accessible even when local processor 220 is unable to boot and/or the bus adapter 122 is inoperable. Another application which may execute in step 710 reads the NVRAM 332 to obtain event log and failure information.

In step 712 the jumper 180 is removed or reset, which unmaps the peripheral device memory and returns the adapter 122 to the appearance of a SCSI controller 122. In step 714 the system is rebooted, and the host CPU 102 again begins its POST procedure. In step 716 the CPU 102 sees the primary PCI interface 302 in the adapter 122 as a SCSI controller, and operation proceeds normally.

Therefore, an improved PCI to PCI interface is shown and described which enables host access to peripheral devices on an adapter even when the adapter is inoperable or the local processor is unable to boot. Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for accessing a memory in a bus adapter of a computer system, the computer system comprising a CPU, a first bus coupled to the CPU, and the bus adapter coupled to the first bus, wherein the bus adapter comprises a bus interface for coupling to said first bus, a second bus coupled to said bus interface, a local processor coupled to said second bus, a peripheral bus coupled to said bus interface, and the memory coupled to said peripheral bus, the method comprising:

configuring said memory coupled to said peripheral bus to map to said bus interface, wherein said memory is accessible by said CPU when said memory is mapped to said bus interface;

said CPU beginning a startup routine after said configuring said memory, wherein said CPU detects said memory coupled to said peripheral bus as being mapped to said bus interface;

said CPU accessing said memory coupled to said peripheral bus in said bus adapter after said CPU beginning said startup routine;

reconfiguring said memory to unmap said memory from said bus interface after said CPU accessing said memory, wherein said memory is accessible to said local processor comprised in said bus adapter in response to said reconfiguring; and said CPU restarting after said reconfiguring said memory.

2. The method of claim 1, wherein said bus interface comprises a first bus interface for coupling to said first bus, a second bus interface coupled to said first bus interface and said second bus, and a peripheral bus interface coupled to said first bus interface and said second bus interface, wherein said peripheral bus is coupled to said peripheral bus interface;

wherein said CPU accessing comprises said CPU accessing said first bus interface, wherein said first bus interface accesses said memory in response to said CPU accessing said first bus interface.

3. The method of claim 1, wherein said local processor is inoperable during said CPU accessing said memory coupled to said peripheral bus.

4. The method of claim 1, wherein said second bus is inaccessible during said CPU accessing said memory coupled to said peripheral bus.

5. The method of claim 1, wherein said CPU accessing comprises accessing said memory without accessing said second bus.

6. The method of claim 1, wherein said bus adapter is inoperable during said CPU accessing.

7. The method of claim 1, wherein said memory is Flash memory storing boot and initialization code for said bus adapter;

wherein said CPU accessing comprises writing new data to said Flash memory.

8. The method of claim 1, wherein said memory is non-volatile random access memory; and wherein said CPU accessing comprises reading failure data from said nonvolatile random access memory.

9. The method of claim 1, wherein said configuring said memory comprises setting a jumper.

10. The method of claim 1, wherein said first and said second buses comply with a peripheral component interconnect (PCI) bus standard.

11. The method of claim 1, wherein said bus adapter is a small computer systems interface adapter.

12. A method for installing and programming a memory in a controller of a computer system, the computer system comprising a CPU, a first bus coupled to the CPU, and the controller coupled to the first bus, wherein the controller comprises a bus interface for coupling to said first bus, a second bus coupled to said bus interface, a jumper coupled to said bus interface, a local processor coupled to said second bus, a peripheral bus, the method comprising:

installing said memory in said controller of said computer system, wherein said memory is not programmed;

configuring said memory after said installing said memory to map said memory to said bus interface, wherein said memory is accessible by said CPU when said memory is mapped to said bus interface;

said CPU beginning a startup routine after said configuring said memory;

said CPU accessing said bus interface to write data to said memory in said controller after said CPU beginning said startup routine;

reconfiguring said memory after said CPU accessing said bus interface to unmap said memory from said bus interface, wherein said memory is accessible to said local processor; and said CPU restarting after reconfiguring said memory.

13. The method of claim 12, wherein said bus interface comprises a first bus interface for coupling to said first bus, a second bus interface coupled to said first bus interface and said second bus, and a peripheral bus interface coupled to said first bus interface and said second bus interface; wherein said peripheral bus is coupled to said peripheral bus interface;

wherein said CPU accessing comprises said CPU accessing said first bus interface, wherein said first bus interface writes to said memory in response to said CPU accessing said first bus interface.

14. The method of claim 12, wherein said local processor is inoperable during said CPU accessing.

15. The method of claim 12, wherein said controller is inoperable during said CPU accessing.

16. The method of claim 12, wherein said memory is Flash memory storing boot and initialization code for said controller;

wherein said CPU accessing comprises writing data to said Flash memory.

* * * * *